(12) United States Patent
Yorke et al.

(10) Patent No.: US 11,524,656 B2
(45) Date of Patent: Dec. 13, 2022

(54) INDEPENDENT VEHICLE SECURITY METHOD AND APPARATUS

(71) Applicant: Voyomotive, LLC, San Francisco, CA (US)

(72) Inventors: Peter Yorke, San Francisco, CA (US); Adam Sloan, Ann Arbor, MI (US); Robert Vogt, IV, Ypsilanti, MI (US)

(73) Assignee: Voyomotive, LLC, San Francisco, CA (US)

( * ) Notice: Subject to any disclaimer, the term of this patent is extended or adjusted under 35 U.S.C. 154(b) by 1291 days.

(21) Appl. No.: 15/544,281

(22) PCT Filed: May 18, 2016

(86) PCT No.: PCT/US2016/032966
§ 371 (c)(1),
(2) Date: Jul. 18, 2017

(87) PCT Pub. No.: WO2016/187243
PCT Pub. Date: Nov. 24, 2016

(65) Prior Publication Data
US 2018/0015905 A1    Jan. 18, 2018

Related U.S. Application Data

(60) Provisional application No. 62/163,676, filed on May 19, 2015.

(51) Int. Cl.
*B60R 25/24* (2013.01)
*B60R 16/03* (2006.01)
*G07C 9/00* (2020.01)

(52) U.S. Cl.
CPC ............. *B60R 25/24* (2013.01); *B60R 16/03* (2013.01); *G07C 9/00309* (2013.01); *G07C 2209/63* (2013.01)

(58) Field of Classification Search
None
See application file for complete search history.

(56) References Cited

U.S. PATENT DOCUMENTS 8,232,864 B2   7/2012  Kakiwaki
9,268,951 B2   2/2016  Oppermann et al.
(Continued)

FOREIGN PATENT DOCUMENTS

JP    2002-087182    3/2002
JP    2005-194799    7/2005
(Continued)

*Primary Examiner* — Carlos Garcia
(74) *Attorney, Agent, or Firm* — James D. Petruzzi; The Petruzzi Law Firm (57) ABSTRACT

A vehicle authorization system with a transmitter/receiver capable of activating vehicle functions operably connected to the vehicle, a wireless transmitter/receiver for an authorized vehicle operator that receives communications from the vehicle transmitter/receiver, a sensor in the vehicle security transmitter/receiver that detects at least one vehicle access parameter via an electronic signal, wherein the vehicle transmitter/receiver communicates with the wireless transmitter/receiver responsive to the sensor detecting a second signal associated with the access parameter to affirm a verification signal from the wireless transmitter/receiver that upon verification permits vehicle access by the operator or upon improper or no response activates a vehicle function to prevent access or vehicle operation. The invention consists of a vehicle security device that can both monitor and control vehicle systems, and a user's smart device. The invention is combined with the existing vehicle keys and fobs to provide a two-step authentication.

15 Claims, 4 Drawing Sheets

(56) References Cited

U.S. PATENT DOCUMENTS

| | | |
|---|---|---|
| 9,275,208 B2 | 3/2016 | Protopapas |
| 9,305,412 B2 | 4/2016 | Winkelman |
| 9,373,201 B2 * | 6/2016 | Jefferies ............ G06Q 30/0645 |
| 9,499,125 B2 | 11/2016 | Akay et al. |
| 2006/0059109 A1 | 3/2006 | Grimes |
| 2010/0013596 A1 | 1/2010 | Kakiwaki |
| 2012/0100806 A1 | 4/2012 | Hall |
| 2014/0039721 A1 | 2/2014 | Protopapas |
| 2014/0091903 A1 | 4/2014 | Birkel et al. |
| 2014/0286492 A1 | 9/2014 | Vasudevan |
| 2015/0116100 A1 | 4/2015 | Yang et al. |
| 2015/0120151 A1 | 4/2015 | Akay et al. |
| 2017/0011572 A1 | 1/2017 | Link, II |
| 2017/0285634 A1 * | 10/2017 | Chin ...................... G08C 17/02 |
| 2017/0287322 A1 * | 10/2017 | Drake .................... E05F 15/77 |

FOREIGN PATENT DOCUMENTS

| | | |
|---|---|---|
| JP | 2014150425 | 8/2014 |
| WO | 9622202 | 7/1996 |

* cited by examiner

INDEPENDENT VEHICLE SECURITY METHOD AND APPARATUS

CROSS REFERENCE TO RELATED APPLICATIONS

This application claims the benefit of U.S. Provisional Patent Application Ser. No. 62/163,676 filed on 19 May 2015, entitled "Vehicle Security Method," which is incorporated herein by reference.

BACKGROUND OF THE INVENTION

Theft of vehicles and of items within vehicles remains a large problem. An increasingly common problem is when existing OEM vehicle security systems are bypassed or compromised, often through inexpensive electronics used by thieves to gain illicit access to a vehicle. When existing OEM vehicle security systems are bypassed or compromised, the unauthorized user can enter and in some cases, start and drive the vehicle. As these devices often do not activate a vehicle's alarm, the unauthorized user does not draw any undue attention to himself and he does not need to force entry into the vehicle by using a tool such as a lock pick or slim jim, or by breaking the window glass. The unauthorized user can often even act in broad daylight in populated areas since others assume that the unauthorized user has legitimate access to the vehicle. In addition to thieves, there are a number of scenarios where someone may have access to the vehicle owner's key and/or key fob, but the vehicle owner only wants to allow limited access to the vehicle. There is a need for an independent vehicle security system that protects the vehicle from unauthorized access.

BRIEF SUMMARY OF THE INVENTION

Figure 4:
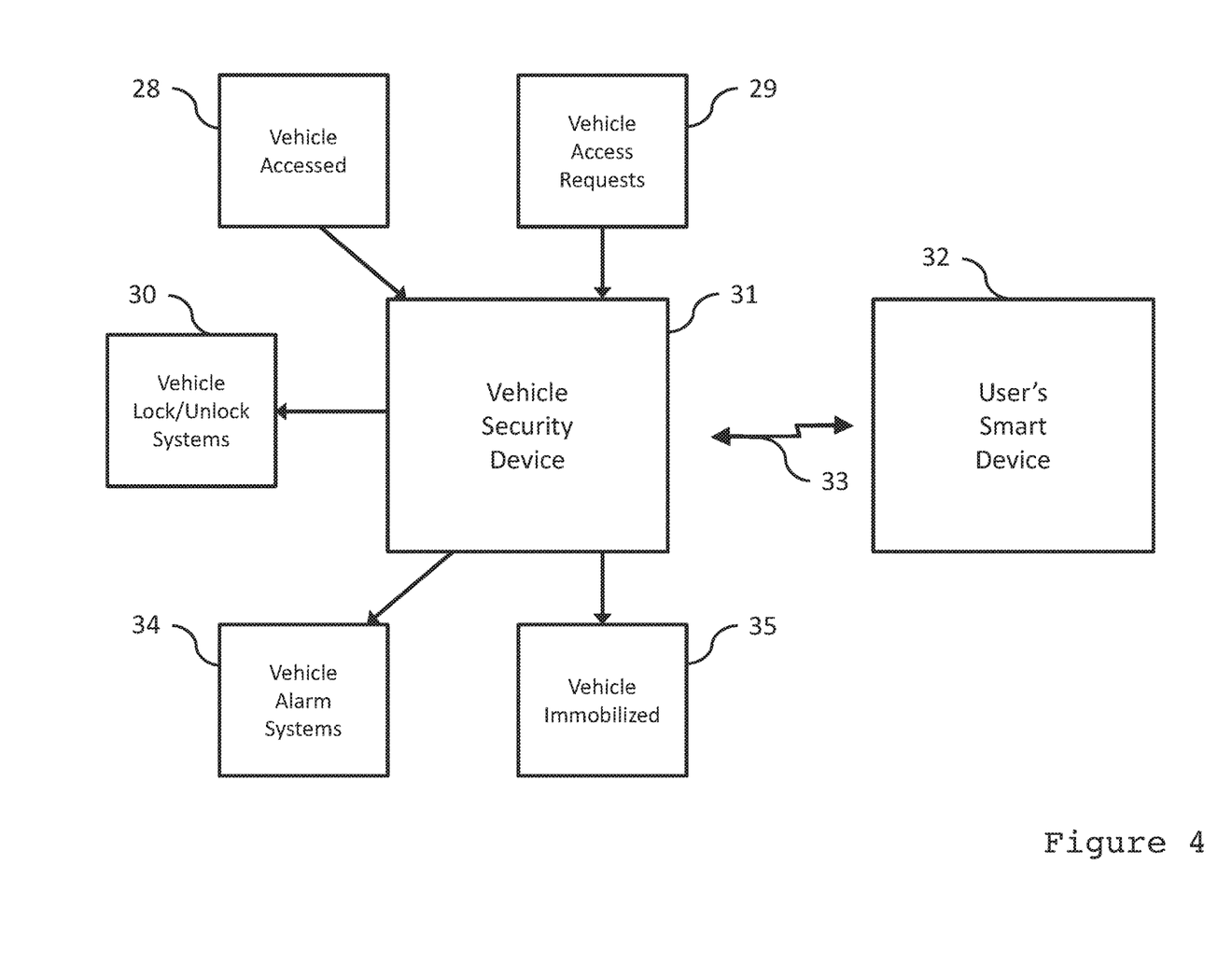
FIG. 4 shows a block diagram of the present invention including the vehicle security device 31, user's smart device 32, wireless communication link 33, and interface with the vehicle systems according to a preferred embodiment of the invention.

The present invention relates to an independent vehicle security system to authorize access into a vehicle and to allow the vehicle to start. The invention consists of a vehicle security device 31 that can both monitor and control vehicle systems, and a user's smart device 32. Both the vehicle security device and user's smart device operate as a transmitter/receiver capable of bi-directional communications via electronic signals. The invention is combined with the existing vehicle keys and fobs to provide a two-step authentication. The vehicle security device 31 can be comprised of one or several standard components installed by the vehicle manufacturer such as an Electronic Control Unit (ECU), or an aftermarket component such as an OBD-II dongle, or a combination thereof. The vehicle security device 31 has the ability to actuate vehicle systems such as door locks, the trunk/hatch, the vehicle alarm, and to prevent the vehicle from starting. The user's smart device 32 is typically a portable electronic device that can establish a wireless communication link 33 (preferably encrypted) and exchange messages with the vehicle security device 31. The invention provides an additional, independent layer of security to that provided by traditional vehicle door locks and vehicle keys and fobs.

Messages are exchanged between the vehicle security device 31 and the user's smart device 32 over the wireless communication link 33 to determine if the user is authorized to access the vehicle. If the user is authorized, the user can access the vehicle via the existing vehicle access systems such as the vehicle key fob and vehicle key. If an authorized user is not present, and access to the vehicle is requested or detected, the invention activates its security mode. When the security mode is "Activated" 19, the invention may employ one or a combination of security measures including locking the vehicle doors and trunk/hatch to prevent or limit access to the vehicle, and/or preventing the vehicle from starting. The invention may also activate the vehicle alarm or other types of vehicle systems used to draw attention such as the horn, lights, etc. or other vehicle functions. The invention de-activates its security mode when an authorized user is present, or after a pre-defined amount of time.

In accordance with a preferred embodiment of the invention, there is shown a vehicle security transmitter/receiver capable of activating vehicle functions operably connected to the vehicle, a wireless transmitter/receiver for an authorized vehicle operator that receives communications from the vehicle security transmitter/receiver, a sensor in the vehicle that communicates with the vehicle security transmitter/receiver that detects at least one vehicle access parameter via an electronic signal, wherein the vehicle security transmitter/receiver transmits to the wireless transmitter/receiver responsive to the sensor detecting a second signal associated with the access parameter to affirm a verification signal from the wireless transmitter/receiver that upon verification permits vehicle access by the operator or upon improper or no response activates a vehicle function to prevent access or vehicle operation.

In accordance with another preferred embodiment of the invention, there is shown a vehicle authorization method for an authorized vehicle user having the steps of exchanging messages with a user's smart device over a wireless communication link to a vehicle based transmitter, determining if the user is authorized to access a vehicle, granting the user access to the vehicle if the user is authorized, and activating a security mode to limit access to the vehicle and/or to prevent the vehicle from starting if an authorized user is not present after access to the vehicle is requested or detected.

In accordance with another preferred embodiment of the invention, there is shown a vehicle security apparatus which authorizes access to a vehicle and allows the vehicle to start, having a user's smart device that exchanges messages over a wireless communication link to create a message query, a sensor in the vehicle that matches the message query to determine if the user is authorized to access to the vehicle, granting the user access to the vehicle if the user is authorized and activating the security mode to limit access to the vehicle and/or to prevent the vehicle from starting if an authorized user is not present and access to the vehicle is requested or detected.

BRIEF DESCRIPTION OF THE DRAWINGS

Advantages of the present invention will be readily appreciated as the same becomes better understood by reference to the following detailed description when considered in connection with the accompanying drawings. The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE EMBODIMENTS

Figure 1:
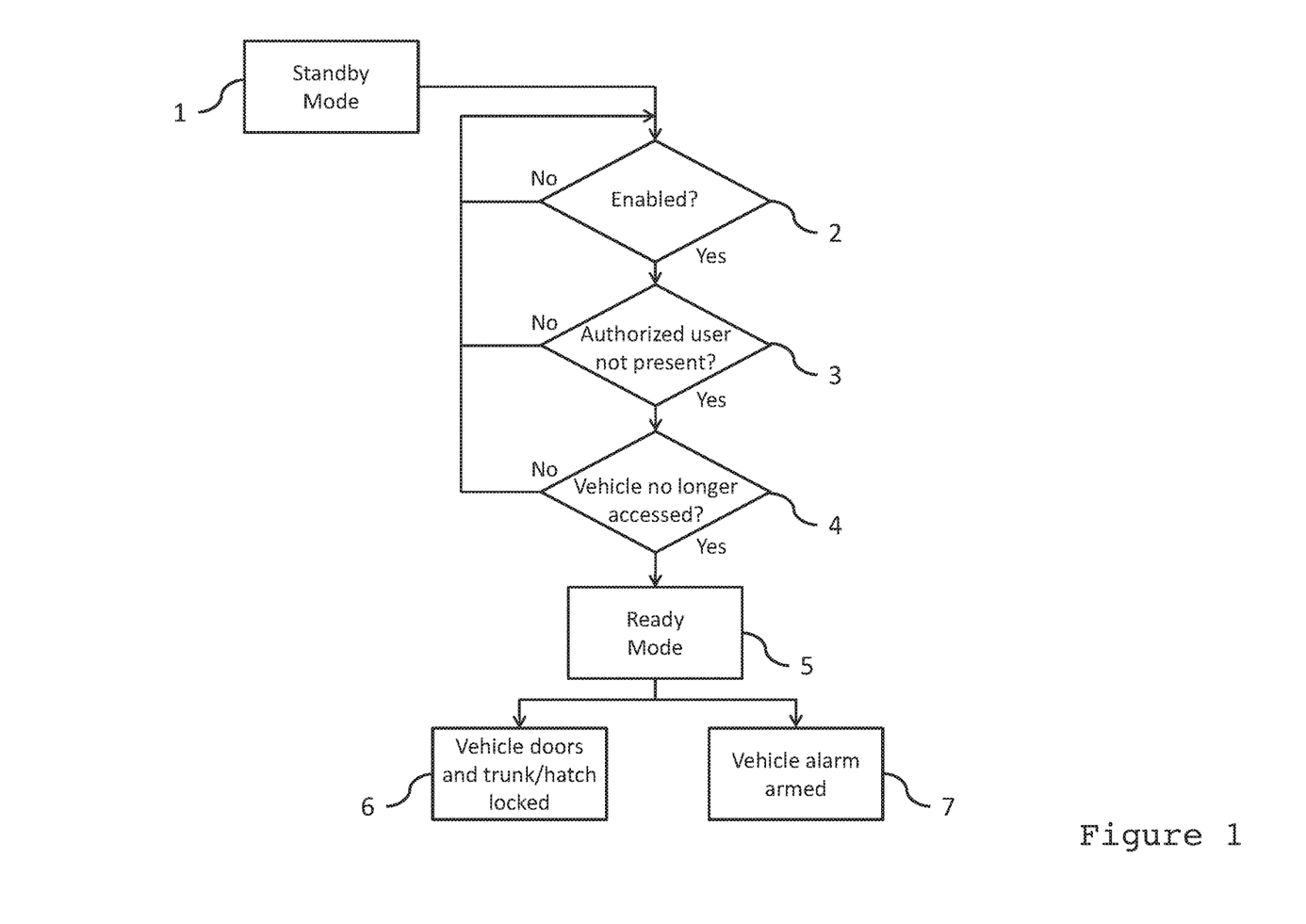
FIG. 1 shows a flow diagram of the operation of the present invention in the security mode "Standby" 1 according to a preferred embodiment of the invention.

FIG. 1 shows a diagram of the operation of the present invention in the security mode "Standby" 1. The security mode is initially "Standby" 1. The vehicle security device 31 repeatedly determines if it is enabled 2. If the answer is "Yes" the vehicle security device 31 determines if an authorized user is not present 3. If the answer is "No" the vehicle security device 31 determines if it is enabled 2. If the answer is "Yes" the vehicle security device 31 determines if the vehicle is no longer being accessed 4. If the answer is "No" the vehicle security device 31 determines if it is enabled 2. If the answer is "Yes" the vehicle security device 31 enters the security mode "Ready" 5. In the security mode "Ready" 5, the vehicle doors and trunk/hatch are locked 6 and the vehicle alarm is armed 7.

Figure 2:
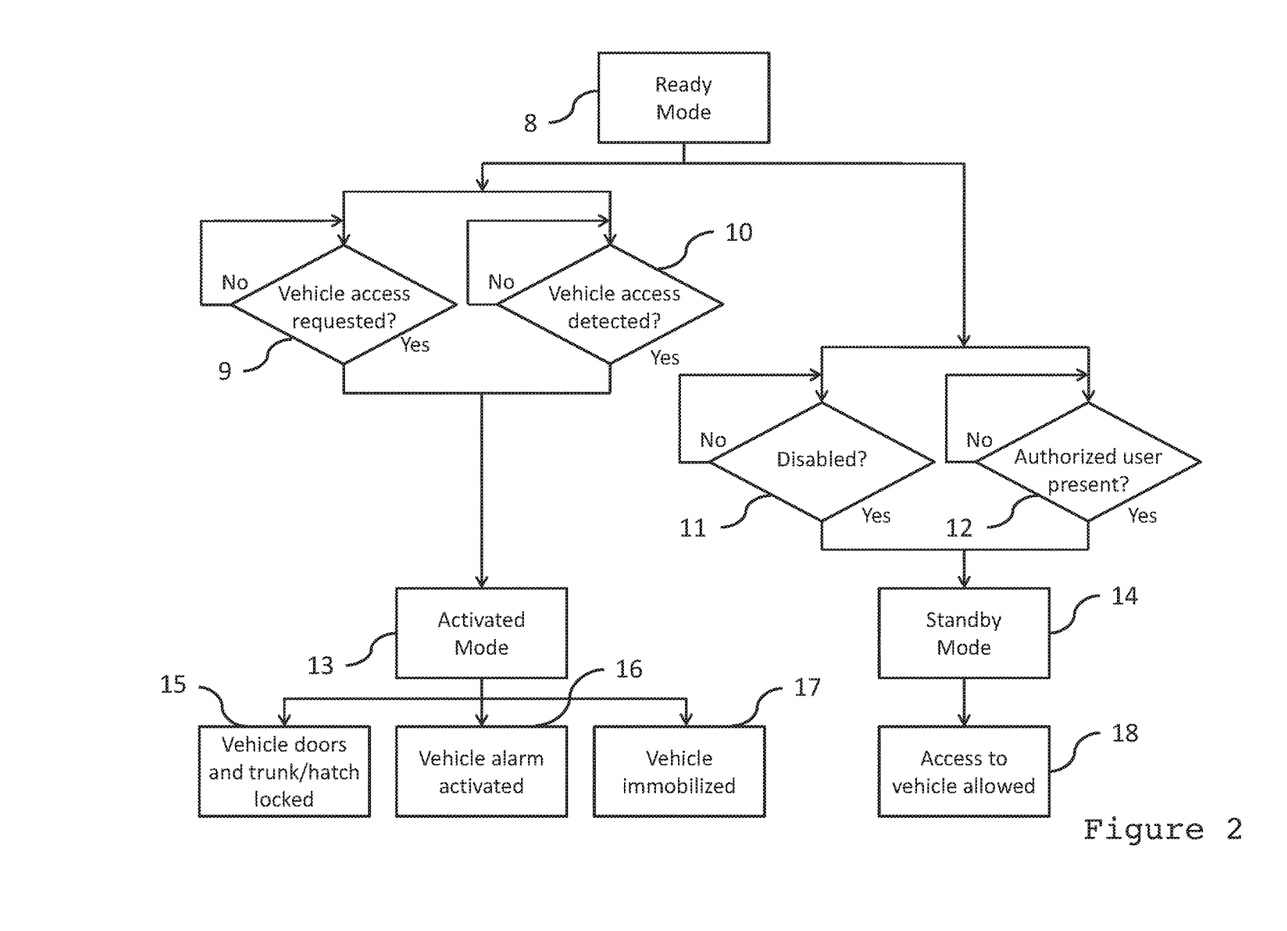
FIG. 2 shows a flow diagram of the operation of the present invention in the security mode "Ready" 8 according to a preferred embodiment of the invention.

FIG. 2 shows a diagram of the operation of the present invention in the security mode "Ready" 8. In the security mode "Ready" 8, the vehicle security device 31 regularly determines if vehicle access is requested 9. The vehicle security device 31 also regularly determines if vehicle access is detected 10. If vehicle access is requested 9 or vehicle access is detected 10, the vehicle security device 31 enters the security mode "Activated" 13. In the security mode "Activated" 13 the vehicle doors and trunk/hatch are locked 15, the vehicle alarm is activated 16, and the vehicle is immobilized 17. In the security mode "Ready" 8, the vehicle security device 31 also regularly determines if it is disabled 11 and if an authorized user is present 12. If the vehicle security device 31 is disabled 11 or an authorized user is present 12, the vehicle security device 31 enters the security mode "Standby" 14. In security mode "Standby" 14 access to the vehicle is allowed 18.

Figure 3:
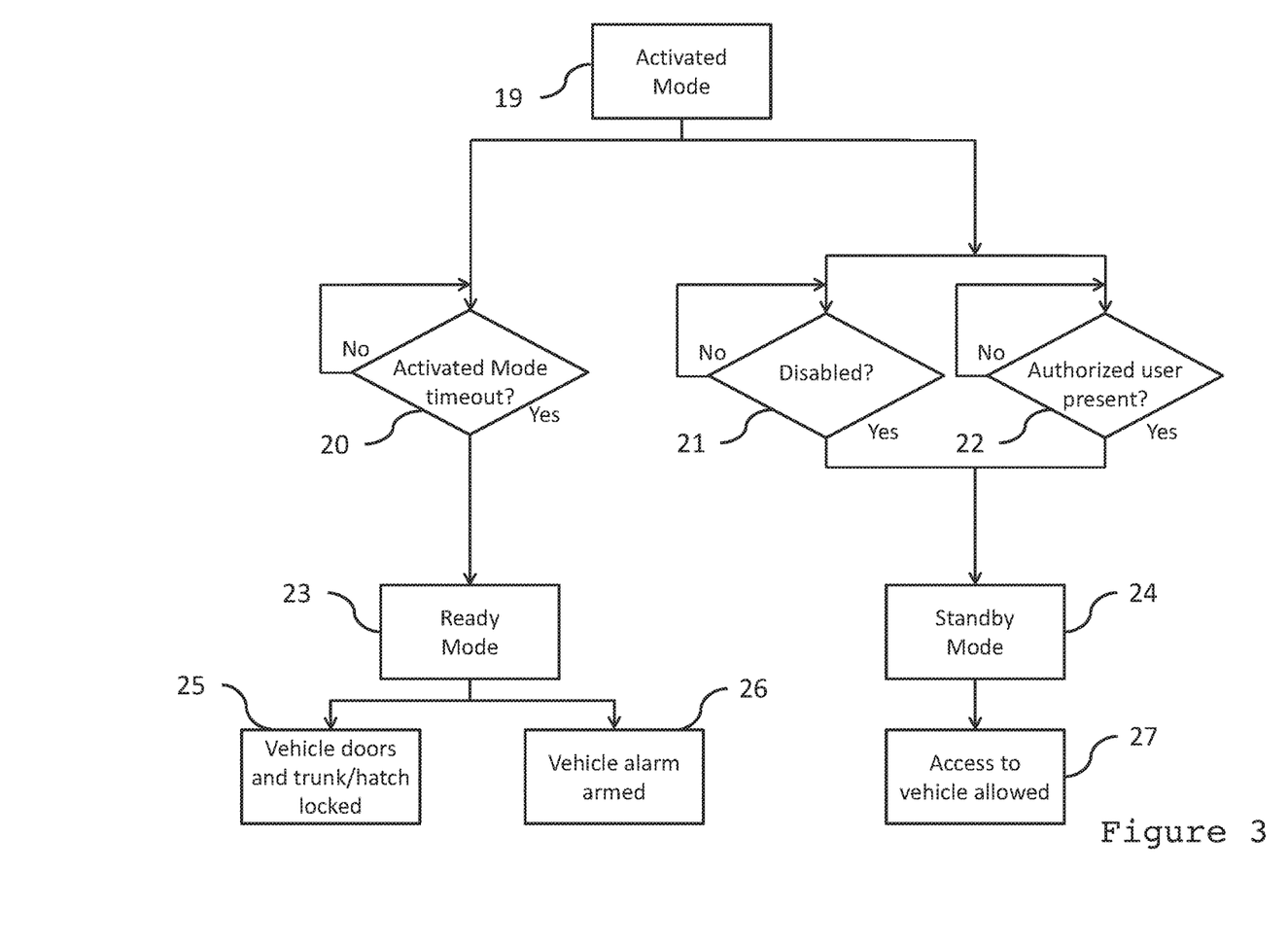
FIG. 3 shows a flow diagram of the operation of the present invention in the security mode "Activated" 19 according to a preferred embodiment of the invention.

FIG. 3 shows a diagram of the operation of the present invention in the security mode "Activated" 19. In the security mode "Activated" 19, the vehicle security device 31 regularly determines if there is a security mode "Activated" timeout 20. If the answer is "Yes" the vehicle security device 31 enters the security mode "Ready" 23. In the security mode "Ready" 23 the vehicle doors and trunk/hatch are locked 25 and the vehicle alarm is armed 26. In the security mode "Activated" 19, the vehicle security device 31 also regularly determines if it is disabled 21 and if an authorized user is present 22. If the vehicle security device 31 is disabled 21 or an authorized user is present 22, the vehicle security device 31 enters the security mode "Standby" 24. In security mode "Standby" 24 access to the vehicle is allowed 27.

FIG. 4 shows a block diagram of the present invention. Messages are exchanged between the vehicle security device 31 and the user's smart device 32 over the wireless communication link 33 to determine if the user is authorized to access the vehicle. The vehicle security device 31 monitors data parameters to detect if access to the vehicle is requested 29. The vehicle security device 31 monitors data parameters to determine if the vehicle has been accessed 28. The vehicle security device 31 has the ability to actuate vehicle lock/unlock systems 30 including door locks and trunk/hatch locks. Lock/unlock systems 30 may have a sensor for detecting an electronic signal request to activate the system or other vehicle functions. The vehicle security device 31 has the ability to actuate the vehicle alarm systems 34 including the alarm and other systems used to draw attention such as the horn and lights. The vehicle security device 31 has the ability to immobilize the vehicle 35 to prevent it from starting.

As an authorized user approaches the vehicle, messages are exchanged between the vehicle security device 31, in certain cases acting as a transmitter, and the user's smart device 32 over the wireless communication link 33 to determine if the user is authorized to access the vehicle. Typically, a sufficient number of messages can be exchanged to allow the vehicle security device 31 to determine whether the user is authorized as the user is approaching the vehicle. The invention determines when a user exits the vicinity of the vehicle. Optionally, no input is needed from the vehicle user to use the invention as they approach the vehicle and exit the vehicle.

The vehicle security device 31 has 3 security modes: "Standby" 1, "Ready" 8, and "Activated" 19. The security mode is initially "Standby" 1. When the security mode is "Standby" 1, access to the vehicle is allowed 18 via the existing vehicle access system such as the vehicle key fob and vehicle key. The security mode is "Standby" 1 whenever an authorized user is present. When the security mode transitions to "Standby" 1, the vehicle security device 31 allows the doors to be opened normally with a key or a key fob. The vehicle security device 31 can optionally unlock the vehicle doors and trunk/hatch and disarm the vehicle alarm. In this case the vehicle doors and trunk/hatch can automatically unlock as the user approaches the vehicle. When an authorized user is no longer present 3 as the user exits the vicinity of the vehicle, and the vehicle security device 31 determines that the vehicle is no longer being accessed 4, the security mode transitions to "Ready" 5.

When the security mode is "Ready" 8, access to the vehicle is restricted via the existing vehicle access system such as the vehicle key fob and vehicle key. When the security mode transitions to "Ready" 5, the vehicle security device 31 locks the vehicle doors and trunk/hatch 6 and arms the vehicle alarm 7. When the security mode is "Ready" 8, if the vehicle security device 31 determines that unauthorized access to the vehicle is requested 9 or that the vehicle has been accessed 10, the security mode transitions to "Activated" 13. When the security mode is "Ready" 8, if an authorized user is determined to be present 12, the security mode transitions to "Standby" 14.

When the security mode is "Activated" 19, the vehicle doors and trunk/hatch remain locked 15, preventing access to the vehicle. In some vehicles unauthorized use of the key fob or other device may momentarily unlock the doors, but the vehicle security device 31 will command the doors to relock. Optionally, the vehicle is commanded immobilized 17, which does not allow the vehicle to start if an unauthorized start is requested. Optionally, the vehicle alarm is activated 16 or other device such as the horn, lights or other vehicle systems or functions are activated. When the security mode is "Activated" 19, if an authorized user is present 22, the security mode transitions to "Standby" 24. When the security mode is "Activated" 19, the security mode can optionally transition to "Ready" 23 after a timeout time 20. When the security mode transitions out of "Activated" 19, the vehicle door and trunk/hatch are no longer continuously commanded locked, the vehicle is no longer commanded immobilized, and the vehicle alarm is de-activated.

The user can optionally configure the behavior of the invention through a user interface. The user can optionally configure whether the vehicle doors and trunk/hatch are unlocked and the vehicle alarm is disarmed when the security mode transitions to "Standby" 1 and an authorized user is present. The user can optionally configure the timeout time for the vehicle security device 31 to transition the security mode from "Activated" 19 to "Ready" 8, and whether or not there is a timeout.

The user can optionally enable or disable the invention. When the invention is disabled the security mode is always "Standby" 1. When the invention is enabled the security mode transitions as described above. The user can optionally configure the invention to operate in manual mode. In manual mode, the user has the ability to manually command each of the 3 vehicle security devices security modes: "Standby" 1, "Ready" 8, "Activated" 19. Different combinations of optional user configurations can be available to the user, or all optional user configurations can be available. Additional configurations can be available. Multiple user's smart devices can be used with a single vehicle security device 31, such that multiple users can establish a wireless communication link 33 and be authorized to access to the vehicle.

The user can optionally configure conditions when the invention is enabled and when the invention is disabled. The user can configure the invention to only be enabled between certain hours of the day. For example, the user can configure the invention to only be enabled between the hours of 10 PM and 6 AM, when vehicle theft is more likely to occur. The user can configure the invention to be disabled for a pre-defined time window, for example a 1 hour time window. This allows for temporary access to the vehicle, which can be useful if the vehicle is a shared vehicle. The user can configure the invention to only be enabled for a certain amount of time after they exit their vehicle, or to be disabled for a certain amount of time after they exit their vehicle. The user can configure the invention to be disabled until the vehicle is next accessed, after which the invention is re-enabled. The user can configure the invention to only be enabled in certain geographic areas, for example in areas that have high or low crime rates.

The user's smart device 32 will typically have a user interface that allows the user to configure the behavior of the invention. The user interface could be a software application on the user's smart device 32. For example, if the user's smart device 32 is a smartphone, the user interface could be a software application on the smartphone, a "smartphone app". The user interface could also be a dedicated interface on the user's smart device 32 that only interfaces with the invention. Alternatively, the user can configure the behavior of the invention through a user interface on the vehicle security device 31. This is not typical since the vehicle security device 31 is located within the vehicle. In an alternative embodiment, the user can configure the behavior of the invention through a user interface on vehicle systems (such as a dashboard head unit). Additionally, the user could choose the configuration options at the time of purchase, and the invention could be configured appropriately at the time it is manufactured.

The electronics necessary to create the user's smart device 32 have a small form factor, so the device can itself have a small form factor, or can be included within existing electronic devices. The user's smart device 32 can be executed on hardware of an existing electronic device. The user's smart device 32 can be a mobile smart phone. The user's 32 can be included within the user's existing key fob or vehicle key at the time of vehicle manufacture. The user's existing key fob or vehicle key can be modified to include the user's smart device 32 after the vehicle has been manufactured. The user's smart device 32 can be a secondary key fob or vehicle key. The user's smart device 32 can be wearable device such as a smart watch.

Different types of wireless communication links can be used to create the wireless communication link 33 between the vehicle security device 31 and the vehicle user's smart device 32. In certain situations, the user's smart device acts as a wireless receiver. An encrypted form of communication is preferred. A wireless communication link standard that uses commercially available electronics is preferred. In some instances, such as when the invention needs to be controlled from a distance, a wireless communication link 33 that has a communication range that extends beyond the immediate vicinity of the vehicle is preferred. Wireless communication link standards that can be used include Bluetooth®, Bluetooth® Low Energy, Wi-Fi®, NFC (Near Field Communication), ZigBee®, and those used for cellular and satellite communication. Further, communications may be via LoRaWAN or Low Power Wide Area Network (LPWAN), a specification intended for wireless battery operated devices. Additional types of commercially available wireless communication link standards can be used, or custom wireless communication links can be used. Alternatively, a wired communication link 33 can be established by connecting the user's smart device 32 to the vehicle security device 31 through a connection point on the exterior of the vehicle.

Each of the wireless communication link standards has a communication range that allows communication to be established and maintained at a certain distance between the vehicle user's smart device 32 and the vehicle security device 31. Many commercially available wireless communication link standards, such as Bluetooth® and Wifi®, have a communication range on the order of 50 feet or more. This allows communication between the user's smart device 32 and the vehicle security device 31 as the user is approaching the vehicle. Typically, a sufficient number of messages can be exchanged to allow the vehicle security device 31 to determine whether the user is authorized as the user is approaching the vehicle. By the time the user gets close enough to the vehicle to use the key fob or vehicle key, the vehicle security device 31 will know if the user is authorized, and can set the security mode to "Standby" 1 or "Activated" 19 as appropriate.

Messages are exchanged between the vehicle security device 31 and the user's smart device 32 on the wireless communication link 33 to authorize the user's access to the vehicle. Strong encryption standards are preferred for the wireless communication link 33 between the vehicle security device 31 and the user's smart device 32. This can prevent the vehicle security provided by the invention from being bypassed or compromised by thieves. The encrypted wireless communication link 33 between the vehicle security device 31 and the user's smart device 32 can use two basic encryption methods: symmetric-key and public-key encryption. In symmetric-key methods, the user's smart device 32 uses the same encryption key that the vehicle security device 31 uses to decrypt the command. In public-key encryption methods, the encryption key used by the user's smart device 32 is different from decryption key that the vehicle security device 31 uses to decrypt the commands.

A 256 bit symmetric-key encryption method such as Advanced Encryption Standard (AES)-256 is preferred.

The vehicle security device 31 and the user's smart device 32 can obtain their encryption keys at the time they are manufactured. Alternatively, the vehicle security device 31 and the user's smart device 32 can obtain their encryption keys at the time of installation. The encryption keys can be communicated to the vehicle security device 31 and the user's smart device 32 using a secure transfer means such connecting to a secured computer at the time of installation. Alternatively, the vehicle security device 31 and/or the user's smart device 32 can be connected to the internet. The encryption keys can be stored on a server maintained by the manufacturer, and can be communicated to the vehicle security device 31 and the user's smart device 32 over the internet using a secure and encrypted internet transfer protocol. Once the vehicle security device 31 and the user's smart device 32 have obtained their encryption keys, encrypted messages sent by the user's smart device 32 will only be able to be decrypted by a vehicle security device 31 with the appropriate encryption key.

To establish the wireless communication link 33 between the vehicle security device 31 and the user's smart device 32, a periodic broadcast message is always sent by the user's smart device 32, even when it is not in range of the vehicle security device 31. When the user's smart device 32 comes within communication range of the vehicle security device 31, the vehicle security device 31 will receive the broadcast message, and send an acknowledge message to the user's smart device 32. When the user's smart device 32 receives the acknowledge message, it will send an initialization vector message to the vehicle security device 31. The initialization vector is used to initiate the encrypted communication between the user's smart device 32 and the vehicle security device 31. The next message that is sent by the user's smart device 32 is encrypted using the initialization vector and the encryption key, and then decrypted by the vehicle security device 31 using the initialization vector and the encryption key.

A block cipher mode of operation is chosen to allow subsequent messages to be exchanged between the user's smart device 32 and the vehicle security device 31 without being vulnerable to attempts to defeat the encryption, such as brute force attacks and replay attacks. An Output Feedback (OFB) mode is preferred, but other modes can be used. Whenever the vehicle security device 31 receives and successfully decrypts an encrypted message, the vehicle security device 31 sends an acknowledge message to the user's smart device 32. When the user's smart device 32 receives the acknowledge message for an encrypted message that it sent, an encrypted 'heartbeat' message is sent by the user's smart device 32 at a periodic rate, for example once per second. When the vehicle security device 31 receives and successfully decrypts the encrypted heartbeat message, the encrypted wireless communication link 33 is established and authorization is affirmed. At this point the vehicle security device 31 transitions to "Standby" 1, and the user is authorized to access the vehicle.

The vehicle security device 31 sends an acknowledge message to the user's smart device 32 whenever the vehicle security device 31 receives and successfully decrypts an encrypted heartbeat message. The user's smart device 32 expects to receive an acknowledge message from the vehicle security device 31 each time it sends an encrypted heartbeat message. The user's smart device 32 does not send a subsequent heartbeat message until it receives an acknowledge message from the vehicle security device 31. If an acknowledge message from the vehicle security device 31 is not received by the user's smart device 32 within a timeout time, the encrypted wireless communication link 33 is no longer established. The user's smart device 32 reverts to sending the periodic broadcast message, and the encrypted wireless communication link 33 must be re-established from the beginning.

The periodic, encrypted heartbeat message sent by the user's smart device 32 is used by the vehicle security device 31 to verify that the authorized user is still present. The user's smart device 32 transmits the heartbeat messages at a regular interval, and vehicle security device 31 expects to receive the heartbeat message at the same regular interval. When the vehicle security device 31 receives a heartbeat message from the user's smart device 32 at the expected interval, the vehicle security device 31 determines that the authorized user is still present. When the vehicle security device 31 does not receive a predetermined number of heartbeat messages at the expected interval, the vehicle security device 31 determines that the authorized user is no longer present.

The invention may use a signal strength indication in combination with the heartbeat message to determine if the user is still present. Most commercially available electronics provide a measure of the signal strength for messages that are received. A signal strength threshold can be used to determine whether the authorized user is still present. When the vehicle security device 31 receives a heartbeat message from the user's smart device 32 at the expected interval, if the signal strength of the received message is above the threshold, the vehicle security device 31 determines that the authorized user is still present. When the vehicle security device 31 receives a heartbeat message from the user's smart device 32 at the expected interval, if the signal strength of the received message is below the threshold for a predetermined number of heartbeat messages, the vehicle security device 31 determines that the authorized user is no longer present. The invention may also use additional methods to determine if the authorized user is still present.

The user can optionally configure the signal strength threshold through a user interface. A relationship can be established between the signal strength of the received message from the user's smart device 32 and the distance between the user's smart device 32 and the vehicle security device 31. This allows the user to optionally configure the distance threshold through a user interface, which is a measure that is more familiar to the user. The signal strength will decrease the further distance the user's smart device 32 is moved away from the vehicle security device 31. An average signal strength can be measured at pre-determined distances between the user's smart device 32 and the vehicle security device 31 to determine the relationship between signal strength and distance. The distance measurements should be taken in an open space such as an open field, since the signal strength of the wireless communication link 33 is effected by obstacles in the environment, such as the metal within the wall of a building.

Using the optional signal strength indication in combination with the heartbeat message is useful for wireless communication link standards that have a fairly long communication range. For example, if the authorized user is inside their house sleeping with the user's smart device 32, and their vehicle is parked in the garage or in the driveway, the authorized user typically wants the security mode to be "Ready" 8. In this example, the authorized user may still be within a communication range that allows the vehicle security device 31 to continue to receive the heartbeat messages from the user's smart device 32. The vehicle security device 31 signal strength threshold can be set to a threshold that is relatively close to the vehicle, for example 10 feet from the vehicle. The vehicle security device 31 would then determine that the user is present when they approach within 10 feet of the vehicle, and determine that the user is no longer present when the user is greater than 10 feet from the vehicle, for example when the user inside their house sleeping.

A hysteresis can be used when determining whether the authorized user is still present. The hysteresis is used at the edge of the communication range of the wireless communication link 33. At the edge of the communication range the vehicle security device 31 will intermittently receive heartbeat messages from the user's smart device 32. The hysteresis is used to prevent the vehicle security device 31 from rapidly transitioning between determining that the authorized user is present and determining that the authorized user is not present. One method that can be used is that after the authorized user is determined to no longer be present, a predetermined number of heartbeat messages can be required to be received in a row to determine that the authorized user is now present. Another method that can be used is that after the authorized user is determined to no longer be present, to not allow the authorized user to be determined to be now present for a predetermined time interval, for example 5 seconds. When the signal strength indication is used in combination with the heartbeat message, a lower signal strength threshold can be used to determine that the authorized user is no longer present, and a higher signal strength threshold can be used to determine that the authorized user in now present.

The vehicle security device 31 can be a standalone ECU or can be part of an existing ECU or a combination of ECU's on the vehicle. The vehicle security device 31 can be an OEM (original equipment manufacturer) ECU included with the vehicle at the time of manufacture, or it can be an aftermarket ECU that is installed on the vehicle after the vehicle has been manufactured. The vehicle security device 31 can be executed on the hardware of an existing ECU on the vehicle. The existing ECU can be reprogrammed to execute the invention. The vehicle security device 31 can be an aftermarket product that is connected to an appropriate, standard vehicle connection outlet such as an OBD-II port, a relay socket, or a fuse port. The vehicle security device 31 can be custom installed by connecting to existing wires and harnesses within the vehicle, including splicing into these components when required.

The vehicle security device 31 can communicate with other ECUs on a vehicle data bus using standard automotive electronic communication protocol such as CAN (Controller Area Network), RS232 Serial, or J1850 PWM (Pulse Width Modulation). The vehicle security device 31 can receive messages sent by other ECUs on the vehicle data bus to monitor the appropriate vehicle data parameters. The vehicle security device 31 can also request specific data parameters from other ECUs on the vehicle data bus and receive the responses for the specific data parameters. The vehicle security device 31 can request the specific data parameters at predetermined periodic rates.

The vehicle security device 31 can read sensors directly to monitor the appropriate vehicle data parameters. The sensors can be wired to the vehicle security device 31. Alternatively, smart sensors can be used that can communicate with the vehicle security device 31 wirelessly. Existing vehicle sensors can be connected to the vehicle security device 31, and new sensors can be installed in the vehicle and connected to the vehicle security device 31 if necessary. The vehicle security device 31 can monitor the appropriate vehicle data monitors using a combination of receiving messages on the vehicle data bus, requesting and receiving specific data parameters on the vehicle data bus, and by reading sensors directly.

The vehicle security device 31 monitors data parameters to determine if access to the vehicle is requested 29. The vehicle security device 31 monitors vehicle key fob requests. The vehicle security determines that access to the vehicle is requested if it monitors a vehicle key fob request to unlock one or more doors, open the trunk/hatch, disarm or de-activate the alarm, or to start the vehicle or other vehicle access parameter. The vehicle security does not determine that access to the vehicle is requested if it monitors a vehicle key fob request to lock the doors or to arm or activate the vehicle alarm.

The vehicle security device 31 monitors vehicle key requests, such as if the vehicle key is inserted into the door key cylinder to attempt to unlock the vehicle. The vehicle security device 31 determines that access to the vehicle is requested if it monitors a vehicle key request to unlock one or more doors or to open the trunk/hatch. The vehicle security device 31 does not determine that access to the vehicle is requested if it monitors a vehicle key request to lock the doors or to lock the trunk/hatch. The vehicle security device 31 can monitor vehicle key fob requests and vehicle key requests individually or in combination. The user can optionally configure the data parameters that are used to determine if access to the vehicle is requested.

The vehicle security device 31 monitors data parameters to determine if the vehicle has been accessed 28. The vehicle security device 31 monitors the vehicle door lock state. The vehicle security device 31 determines that the vehicle has been accessed if any of the 4 door locks are unlocked. The vehicle security device 31 monitors the lock/unlock button in the vehicle. The vehicle security device 31 determines that the vehicle has been accessed if unlock or lock is pressed on the lock/unlock button. The vehicle security device 31 monitors the vehicle alarm state. The vehicle security device 31 determines that the vehicle has been accessed if the vehicle alarm is disarmed or activated.

The vehicle security device 31 monitors the vehicle door open state and trunk/hatch open state. The vehicle security device 31 determines that the vehicle has been accessed if any of the 4 doors are open or the trunk/hatch is open. The vehicle security device 31 monitors the vehicle ignition switch. The vehicle security device 31 determines that the vehicle has been accessed if the vehicle ignition switch is any position besides Off. The vehicle security device 31 monitors the engine running state. The vehicle security device 31 determines that the vehicle has been accessed if the engine RPM is above a threshold that would indicate that it is running or attempting to be started. The vehicle security device 31 monitors the hood and window open state. The vehicle security device 31 determines that the vehicle has been accessed if the hood is open or any of the windows are open.

The vehicle security device 31 can monitor additional data parameters to determine if the vehicle is accessed 28. For example, the vehicle security device 31 could monitor if any of the buttons within the vehicle have been pressed such as radio buttons, HVAC buttons, and light buttons. The vehicle security device 31 can determine if the glove box has been opened or the seat sensors detect an increase in pressure. The vehicle security device 31 can monitor the data parameters described above individually or in various combinations. The user can optionally configure the data parameters that are used to determine if the vehicle is accessed.

The vehicle security device 31 determines that the vehicle is no longer being accessed by monitoring the data parameters described above. The vehicle security device 31 typically determines that the vehicle is no longer being accessed if the 4 doors are closed, the trunk/hatch is closed, the vehicle ignition switch is Off, and the engine is not running. The vehicle security device 31 can monitor additional data parameters to determine if the vehicle is no longer being accessed. The vehicle security device 31 can monitor the data parameters described above individually or in various combinations. The user can optionally configure the data parameters that are used to determine if the vehicle is no longer being accessed.

The vehicle security device 31 has the ability to actuate vehicle systems such as door locks, the trunk/hatch, the vehicle alarm, and optionally to prevent the vehicle from starting. The vehicle security device 31 can send command requests to other ECUs on the vehicle on the vehicle data bus. The ECU that is wired to the actuator receives the command request message, it will perform the actuation. After the ECU performs the actuation, it typically sends a success or fail response message that can be monitored by the vehicle security device 31. If a fail response is received, a command request can be resent by the vehicle security device 31.

The vehicle security device 31 can directly actuate vehicle systems when the actuator and/or a controller is directly wired to the vehicle security device 31. Alternatively, smart actuators and/or controllers can be used that can communicate with the vehicle security device 31 wirelessly using existing wireless communication link standards. Existing vehicle actuators and/or controllers can be connected to the vehicle security device 31. New actuators and/or controllers can be installed in the vehicle and connected to the vehicle security device 31 if necessary. For example, if the vehicle did not have power door locks, door lock actuators could be installed in the vehicle and connected to the vehicle security device 31. The vehicle security device 31 can perform actuations using a combination of sending command requests to other ECUs on the vehicle data bus and directly connecting to actuators.

The invention may be used in combination with 3rd party systems that can actuate and/or control vehicle systems such as door locks, the trunk/hatch, the vehicle alarm, and to prevent the vehicle from starting. The vehicle security device 31 can communicate with 3rd party systems by sending command requests to the 3rd party device over a vehicle data bus, directly wiring to the 3rd party system, and by communicating wirelessly with the 3rd party system using existing wireless communication link standards. For example, the vehicle security device 31 can communicate with an aftermarket vehicle immobilizer security system that has the ability to prevent the vehicle from starting.

The vehicle security device 31 has the ability to actuate the vehicle door locks and the trunk/hatch 30. The vehicle security device 31 can typically unlock the driver door, unlock all doors, and lock all doors. The vehicle security device 31 can lock and unlock individual doors on some vehicles. The vehicle security device 31 can unlock the vehicle trunk/hatch if there is a lock mechanism on the vehicle trunk/hatch.

On appropriately equipped vehicles, the vehicle security device 31 has the ability to arm, disarm, activate, and de-activate the vehicle alarm 34. The vehicle alarm could be the OEM alarm that was installed in the vehicle at the time of manufacture, an aftermarket alarm that was installed in the vehicle, or both alarms. The vehicle security device 31 has the ability to create a vehicle alarm by actuating existing vehicle systems. This typically includes actuating and then de-actuating the vehicle horn, headlights, and taillights periodically when the alarm is activated. For example, the vehicle horn, headlights, and taillights can be actuated for 1 s and then de-actuated for 1 s continuously while the alarm is activated. Additional vehicle systems can be actuated to draw attention to the vehicle, including the hazard lights, brake lights, fog lights, and windshield wipers. These existing vehicle systems can be actuated individually or in combination with the OEM alarm and the aftermarket alarm.

The vehicle security device 31 has the ability to prevent access to the vehicle by continuously commanding the vehicle doors and the trunk/hatch locked. The vehicle security device 31 can send repeated command requests to other ECUs on the vehicle data bus, such as the body controller or door modules, to continuously command the vehicle doors and trunk/hatch locked. The vehicle security device 31 can continuously directly actuate the vehicle door lock and trunk/hatch lock actuators that are directly wired to the vehicle security device 31. The vehicle security device 31 can continuously command the wireless smart actuators to lock the vehicle doors and trunk/hatch. Additional actuators can be installed in the vehicle that will not physically allow the existing door lock and trunk/hatch lock actuators to unlock. Other methods can be used to continuously command the vehicle doors and trunk/hatch locked.

The vehicle security device 31 has the ability to prevent access to the vehicle by preventing the vehicle doors and trunk/hatch from being unlocked after they are initially locked. After the doors and trunk/hatch are locked, the vehicle security device 31 can interrupt power to the actuators that control the door locks and trunk/hatch lock to prevent the doors or trunk/hatch from being unlocked. After the doors and trunk/hatch are locked, the vehicle security device 31 can interrupt power to the ECUs on the vehicle that control the door locks and trunk/hatch lock to prevent the doors or trunk/hatch from being unlocked. Other methods can be used to prevent the vehicle doors and trunk/hatch from being unlocked, including sending a disable unlock software command to the appropriate controller or actuator. In vehicles where it is not possible to prevent a door from unlocking, the vehicle security device 31 can command the doors to relock repeatedly in order to inhibit vehicle access.

The vehicle security device 31 has the ability to prevent the vehicle from starting 35. The vehicle security device 31 can prevent the fuel pump, spark plugs, fuel injectors, and/or starter motor from being actuated by sending command requests to other ECUs on the vehicle data bus. The vehicle security device 31 can prevent the fuel pump, spark plugs, fuel injectors, and/or starter motor from being actuated by directly connecting to these actuators and disabling power or control signals to them. The vehicle security device 31 can send command requests to other ECUs on the vehicle data bus, such as the engine controller, to not allow the existing vehicle authentication systems to pass. The vehicle security device 31 can disable power to ECUs on the vehicle that are required to start the vehicle, such as the engine controller. Smart relays can be used to disable power to the fuel pump, spark plugs, fuel injectors, starter motor, and/or vehicle ECUs when commanded by the vehicle security device 31. The vehicle security device 31 can communicate with the smart relays by directly connecting to them, using wireless communication protocols, or using power line communication protocols over the existing power buses on the vehicle. In some cases, the vehicle security device 31 can shut off the engine if it has already been started using the methods described above. On vehicles with alternative propulsion systems including hybrid-electric vehicles, electric vehicles, and fuel cell vehicles; the vehicle security device 31 can prevent the vehicle from starting and the propulsion systems from activating using similar methods as vehicles with internal combustion engines.

Modern vehicles manufactured by OEMs use a combination of key fobs, keys, and alarms to provide vehicle security. Modern vehicle key fobs typically allow the user to unlock and lock the vehicle doors and trunk/hatch; arm, disarm, and activate the alarm; and in some cases remote start the vehicle. Modern vehicles typically have a vehicle key that is inserted into the ignition switch and turned to start the vehicle.

With a modern conventional vehicle key fob system, the vehicle key fob communicates with an ECU on the vehicle via Radio Frequency (RF) communication. Basic authentication methods are used between the vehicle key fob and the vehicle ECU to ensure that the vehicle key fob has the appropriate access to the vehicle. When the user presses the unlock button on the vehicle key fob, a RF unlock request is sent from the vehicle key fob to the vehicle ECU. Typically, this will involve a request/challenge/response sequence. The vehicle key fob will first request access, then the vehicle ECU will generate a random challenge seed and send it to the vehicle key fob. Next both the vehicle key fob and the vehicle ECU will calculate a response to the challenge seed, using an algorithm that is known to both devices. The vehicle key fob will send the calculated response to the vehicle ECU, and if the response matches that sent by the vehicle key fob the request is authenticated successfully. The vehicle ECU will send an electrical signal to the vehicle door lock mechanism to unlock the vehicle doors.

With a modern conventional vehicle key system, the vehicle key typically passively communicates with an ECU on the vehicle via RF communication. When the user attempts to start the vehicle, a vehicle ECU determines that the user has attempted to start the vehicle, and receives the passive RF communication from the vehicle key. The vehicle ECU will authenticate the passive RF communication from the vehicle key and determine if the vehicle is allowed to be started.

Some modern vehicles use a smart key system along with a push-button ignition switch instead of a vehicle key that is inserted into an ignition switch. The same vehicle key fob communicates with an ECU on the vehicle via RF communication. When the user attempts to start the vehicle by pressing the push-button ignition switch, the vehicle ECU determines that the user has attempted to start the vehicle. The vehicle ECU then uses basic authentication methods to determine if the vehicle key fob is still present in the vehicle and to determine if the vehicle is allowed to be started.

The invention is designed to prevent or hinder an unauthorized user such as a thief from bypassing existing OEM vehicle security systems. An unauthorized user can bypass existing OEM vehicle security systems using a number of methods. The unauthorized user can steal the vehicle owner's key or key fob. The unauthorized user can obtain an additional key or key fob specific that is authenticated to a specific vehicle from a vehicle dealership or auto parts supplier. The unauthorized user can obtain an unauthenticated additional key or key fob specific to a type of vehicle, and then perform an authentication learn procedure on a specific vehicle that they are attempting to steal.

Additionally, an unauthorized user can compromise the existing OEM vehicle security systems using a number of methods. An unauthorized user can use relatively inexpensive electronics to create an electromagnetic pulse in the near vicinity of electronic door lock actuators, which can cause the power door locks to unlock. An unauthorized user can use relatively inexpensive electronics to 'spoof' a vehicle key fob by sending the same request/challenge/response sequences as an existing vehicle key fob. The spoofing device can request access, and then use a brute force method to rapidly send many responses to the challenge seed that the vehicle ECU sent. Once the correct response is discovered, the vehicle key fob request is authenticated and the unauthorized user will have access to the vehicle. This process can take anywhere from seconds to several hours depending on the level of security of the existing OEM vehicle security system.

The brute force method is not ideal, and the unauthorized user can use improved methods to compromise the existing OEM vehicle security systems. Frequently, vulnerabilities in existing OEM vehicle security systems that will become known. The vulnerabilities can allow the spoofing device to know the correct response to the challenge seed, or to significantly narrow down the possibilities, allowing the spoofing device to find the correct response much quicker. The unauthorized user can use the same or similar inexpensive electronics to monitor the communication between the existing vehicle key fob and the vehicle ECU when the vehicle key fob is used by the vehicle owner. The spoofing device can then recreate this communication directly, or use the knowledge of the communication to determine the security algorithm that is being used, and then send the appropriate request/challenge/response sequences.

On vehicles that use a smart key system, including many high end vehicles, an unauthorized user can use a power amplifier to greatly extend the wireless RF range of the smart key without the vehicle owner's knowledge. The smart key will then authenticate with an ECU on the vehicle as normal, and access can be granted access to the vehicle without the vehicle owner's knowledge. A power amplifier can be used even if the vehicle owner is in a building and the vehicle is outside.

In addition to thieves, there are a number of scenarios where someone may have access to the vehicle owner's key and/or key fob, but the vehicle owner wants to restrict access to the vehicle. The vehicle may be shared amongst a family or roommates, and the vehicle owner may only want to allow sharing during specific times of the day. For example, the vehicle owner may only want to allow access to the vehicle during daytime hours. The vehicle may be shared as part of a commercial vehicle sharing program. The vehicle owner may only want to allow access to the vehicle if the user has the key and/or key fob and the user has been properly validated as the legitimate user for a specific time block by the commercial vehicle sharing program.

The invention can be combined with an existing automatic lock unlock system. An automatic lock unlock system unlocks the vehicle doors and trunk/hatch and disarms the vehicle alarm as the user approaches the vehicle; and locks the vehicle doors and trunk/hatch and arms the vehicle alarm as the user exits the vehicle. Typically, the automatic lock unlock system detects the key fob in range to determine when to unlock/disarm the vehicle and the key fob out of range to determine when to lock/arm the vehicle. Other methods may be used by the existing automatic lock unlock system to determine when the user is approaching or exiting the vehicle.

When the invention is used with an existing automatic lock unlock system, a wireless communication link is chosen that has a greater communication range than that of the existing automatic lock unlock system. As the user is approaching the vehicle, the vehicle security device 31 determines whether the user is authorized prior to the existing automatic lock unlock system unlocking and disarming the vehicle. If the user is authorized, the security mode is "Standby" 1, and the vehicle doors and trunk/hatch are successfully unlocked and the vehicle alarm is successfully disarmed. If the user is not authorized, the security mode remains "Ready" 8, and when the existing automatic lock unlock system attempts to unlock and disarm the vehicle, the security mode is "Activated" 19, and access to the vehicle is not granted. As the user exits the vehicle, typically the existing automatic lock unlock system will lock and arm the vehicle first, and then the security mode will transition to "Ready" 8. If instead the security mode transitions to "Ready" 8 first, the security mode remains "Ready" 8 when the existing automatic lock unlock system locks and arms the vehicle.

The vehicle security device 31 can alternatively establish secure wireless communication independent from the user's smart device 32. The vehicle security device 31 can communicate over a secure wireless cellular network using electronics within the device itself, or by sending information to other ECUs on the vehicle data bus that have the ability to communicate over a secure wireless cellular network. The vehicle security device 31 can then communicate with other devices on the internet on the secure wireless cellular network using standard internet communication protocols.

When the vehicle security device 31 can communicate over a secure wireless cellular network, the user can optionally configure the behavior of the invention through a remote user interface. The remote user interface can be a computer terminal, a smartphone, or any other interface on a device that can communicate using standard internet protocols. For example, the user can optionally enable or disable the invention from a computer terminal or a smartphone. The user can temporarily disable the invention through the remote user interface to allow one time access to the vehicle. This can be useful if the vehicle is a shared vehicle. The user can disable the invention for a specified time window, for example a 1 hour time window. The user can authorize a 3rd party to temporarily disable the invention through the remote user interface to allow temporary access to the vehicle. For example, an employee at a call center could grant temporary access to the vehicle if a user calls and provides the employee with the appropriate credentials.

When the vehicle security device 31 can communicate over a secure wireless cellular network, the user's smart device 32 can optionally also communicate over the secure wireless cellular network. Information can be exchanged between the vehicle security device 31 and the user's smart device 32 over the secure wireless cellular network to determine if the user is authorized. For example, if the vehicle security device 31 and the user's smart device 32 exchange location information over the secure wireless cellular network, and are determined to be in geographic proximity, the user can be determined to be an authorized user. This allows an authorized user to be determined over the secure wireless cellular network, and allows the user access to the vehicle when the user is in geographic proximity to the vehicle.

The vehicle security device 31 can maintain a historical activity log. The activity log can contain the historical details of security modes, when an authorized user is present and no longer present, when access to a vehicle is requested or detected, and how access to a vehicle is requested or detected. The user can receive an immediate specific activity notification when specific activities occur, such as when an authorized user accesses the vehicle, or access to the vehicle is requested or detected when an authorized user is not present. If communication cannot be immediately established with the user, the user can receive a specific activity notification when communication can be established with the user, including the time that the specific activity occurred. The user can receive a summary of the recent historical activity, such as the number of times that the vehicle has been accessed. The user can receive the complete historical activity log.

The historical activity log and specific activity notifications are typically communicated from the vehicle security device 31 to the user's smart device 32 over the wireless communication link 33, when the user's smart device 32 is within the communication range of the vehicle security device 31. The historical activity log information can be displayed to the user on a user interface on the user's smart device 32. Alternatively, the vehicle security device 31 can display the historical activity log information to the user on a user interface on the vehicle security device 31.

When the vehicle security device 31 can communicate over a secure wireless cellular network, it can send the historical activity log and specific activity notifications to the user over the secure wireless cellular network. The historical activity log and specific activity notifications can be sent to the user via standard internet communication protocols such as email, text/SMS/MMS messages, and automated phone calls to the user. For example, the user can receive a text message on their smartphone if access to the vehicle is detected and an authorized user is not present. The email, text/SMS/MMS messages, and automated phone calls can be generated by the vehicle security device 31 itself, or by other ECUs on the vehicle data bus. The email, text/SMS/MMS messages, and automated phone calls can alternatively be generated by a secure server connected to the internet that receives the information from the vehicle security device 31.

When the vehicle security device 31 can communicate over the secure wireless cellular network, it can send the historical activity log and specific activity notifications to a 3rd party over the secure wireless cellular network. Alternatively, if the user's smart device 32 can communication over a secure wireless cellular network, the historical activity log and specific activity notifications can be communicated from the vehicle security device 31 to the user's smart device 32 over the wireless communication link 33, and then sent to a 3rd party from the user's smart device 32.

The historical activity log and specific activity notifications different types of 3rd parties, including vehicle security companies, law enforcement personnel, and/or vehicle insurers. The 3rd party can have an automated response to certain types of historical activity log and specific activity notifications that are received. The 3rd party can alternatively have an employee monitoring the historical activity log and specific activity notifications, and may take appropriate action based on the employee's discretion.

The user can optionally configure the historical activity log and the specific activity notifications through a user interface. The user can optionally configure the types of information that are stored in the historical activity log, if any, and the types of events that generate specific activity notifications, if any. The user can optionally configure how the historical activity log and specific activity notifications are sent to the user including over the wireless communication link 33 only, and/or via email, text/SMS/MMS messages, or automated phone calls. The user can optionally configure the types of historical activity log information and specific activity notifications that are sent to a 3rd party, if any, and which 3rd parties receive the information. The user can optionally configure how long the information in the historical activity log is stored, for example store the most recent 6 months of data in the historical activity log.

A network enabled vehicle experiencing an unauthorized entry attempt can optionally issue an alert that can be relayed to other network enabled vehicles equipped with the vehicle security device 31. These alert messages can be used to trigger the alarms (or alarm like features) of these nearby vehicles to draw even greater attention to the intrusion attempt or to send alerts to designated parties such as the vehicle owners or law enforcement. Alerts reported by the vehicle security device 31 can distinguish which vehicle was the target of the original intrusion attempt versus which vehicles were issued a command from the network, if attempts on multiple vehicles were attempted, or a general radio based scan was made to locate susceptible vehicles. In a separate embodiment, a network based on short range communication from vehicle to vehicle can be used to activate the alarms of other vehicles.

In one embodiment the vehicle security device 31 contains a radio receiver and is capable of receiving RF communication in the RF frequency range that is used by modern conventional vehicle key fob systems. The RF frequency range is typically 315 MHz for vehicles made in North America and 433.92 MHz for vehicles made in Europe and Asia. The vehicle security device 31 is capable of receiving the RF communication between the vehicle key fob and the vehicle ECU; including the access request from the vehicle key fob, the challenge seed from the vehicle ECU, and the calculated response from the vehicle key fob.

In this embodiment, the vehicle security device 31 monitors RF communication to determine if access to the vehicle is requested. The vehicle security device 31 determines that access to the vehicle is requested if it monitors RF communication that it determines to be a vehicle key fob request to unlock one or more doors, open the trunk/hatch, disarm or de-activate the alarm, or to start the vehicle. When the security mode is "Ready" 8, if the vehicle security device 31 determines that unauthorized access to the vehicle is requested or that the vehicle has been accessed, the security mode transitions to "Activated" 19.

In this embodiment, the vehicle security device 31 additionally monitors RF communication for attempts to compromise existing OEM vehicle security systems. The vehicle security device 31 monitors RF communication to determine if a brute force method is being used in an attempt to access the vehicle. If the vehicle security device 31 monitors a predetermined number of access requests followed by incorrect responses to the challenge seed that the vehicle ECU sent, the vehicle security device 31 determines that a brute force method is being used in an attempt to compromise the existing OEM vehicle security systems.

The vehicle security device 31 monitors RF communication to determine if a known vulnerabilities method is being used in an attempt to access the vehicle. The vehicle security device 31 maintains a record of vehicle access requests that are known vulnerabilities in existing OEM vehicle security systems. If the vehicle security device 31 monitors a predetermined number of unsuccessful requests to access the vehicle using access requests that are known vulnerabilities in existing OEM vehicle security systems, the vehicle security device 31 determines that a known vulnerabilities method is being used in an attempt to compromise the existing OEM vehicle security system. When the vehicle security device 31 can communicate over a secure wireless cellular network, the vehicle security device 31 can regularly update its record of vehicle access requests that are known vulnerabilities in existing OEM vehicle security systems by communicating with a secure server connected to the internet.

In this embodiment, the vehicle security device 31 additionally monitors RF communication for attempts to compromise existing OEM vehicle security systems in the vicinity of the vehicle. The vehicle security device 31 is capable of receiving the RF communication between vehicle key fobs and the vehicle ECUs for all vehicles in the vicinity. The vehicle security device 31 monitors RF communication to determine if a brute force method is being used in an attempt to access vehicles in the vicinity. The vehicle security device 31 monitors RF communication to determine if a known vulnerabilities method is being used in an attempt to access vehicles in the vicinity.

When the vehicle security device 31 determines that there is an attempt to compromise the existing OEM vehicle security system, or existing OEM vehicle security systems in the vicinity of the vehicle, the vehicle security device 31 may activate the vehicle alarm or other types of vehicle systems used to draw attention such as the horn, lights, etc. When the vehicle security device 31 can communicate over the secure wireless cellular network, it can optionally send a notification to the vehicle owner and to 3rd parties, including vehicle security companies, law enforcement personnel, and/or vehicle insurers. A networked enabled vehicle can optionally issue an alert that can be relayed to other networked enabled vehicles equipped with the vehicle security device 31 and used to trigger the alarms (or alarm like features) of these nearby vehicles.

In one embodiment, two-step verification is used to authorize the user's access to the vehicle. The first step of the verification is the messages that are exchanged between the vehicle security device 31 and the user's smart device 32 on the wireless communication link 33. When two-step verification is used, the user is required to complete a second verification step before the user is determined to be authorized. The second verification step can be a pin or password that the user is required to enter into the user interface on the user's smart device 32. The second verification step can be a pin or password that the user is required to enter into the user interface on the vehicle security device 31. If first step of the verification is completed successfully, and the pin or password is successful entered by the user in the second verification step, an authorized user is determined to be present. The user can then access the vehicle via the existing vehicle access systems such as the vehicle key fob and vehicle key. If the first step of the verification is completed successfully, but the pin or password is not successfully entered by the user in the second verification, an authorized user is not determined to be present. The vehicle security device 31 will maintain the appropriate security mode.

When two-step verification is used to authorize the user's access to the vehicle, the second verification step can optionally allow temporary access to the vehicle only. The second verification step can be a pin or password that the user is required to enter into the user interface on the user's smart device 32 or the vehicle security device 31. The pin or password can only be valid for a certain number of uses, for example 2 uses only. The pin or password can only be valid for a certain amount of time, for example 30 minutes from when the user received the pin or password. The pin or password can only be valid during certain windows of time, for example from 8 AM to 10 AM. If first step of the verification is completed successfully, and the pin or password is valid and is successful entered by the user and in the second verification step, an authorized user is determined to be present. If the first step of the verification is completed successfully, and the pin or password is entered by the user but is not currently valid in the second verification step, an authorized user is not determined to be present. A second verification step that only allows temporary access to the vehicle is useful for applications where a vehicle is shared among a group of users.

Although described with reference to preferred embodiments of the invention, it should be readily understood that various changes and/or modifications can be made to the invention without departing from the spirit thereof. In general, the invention is only intended to be limited by the scope of the issued claims.

The invention claimed is:

1. A vehicle authorization system for an authorized vehicle operator comprising:
   a) a vehicle security device capable of activating vehicle functions when operably connected to a vehicle fuse port, the vehicle security device having three modes of operation: standby, ready, and activated, wherein;
   b) user's smart device for the authorized vehicle operator that receives communications from the vehicle security device;
   c) a sensor in the vehicle that communicates with a vehicle security device that detects at least one vehicle access parameter via an electronic signal;
   d) wherein the vehicle security device transmits to the user's smart device responsive to the sensor detecting the electronic signal associated with the at least one vehicle access parameter to affirm a verification signal from the user's smart device to be in the ready mode when the user's smart device for an authorized vehicle operator is outside of a range indicating the user is no longer present; and
   e) the vehicle security device interrupts power to a vehicle's ECU(s) upon command signals from the vehicle security device thereby preventing access or vehicle operation.

2. The vehicle authorization system for an authorized vehicle operator as claimed in claim 1 further comprising a user interface that allows the operator to configure the vehicle security device via the user's smart device.

3. The vehicle authorization system for an authorized vehicle operator as claimed in claim 1 further comprising where the vehicle security device can establish independent secure wireless communication.

4. The vehicle authorization system for an authorized vehicle operator as claimed in claim 1 further comprising a historical activity log stored in the vehicle security device.

5. The vehicle authorization system for an authorized vehicle operator as claimed in claim 1 further comprising notification signals to the user's smart device when specific pre-determined number of access requests followed by incorrect responses are received by the vehicle security device.

6. A device for a vehicle comprising:
   a. a vehicle security relay connected to a fuse port having at least three modes of operation: standby, ready, and activated;
   b. user's smart device for an authorized vehicle operator that receives communications from the vehicle security device relay;
   c. the vehicle security device relay is operably connected a vehicle ECU power;
   d. a vehicle ECU receives instructions from a vehicle key fob associated with the vehicle to authenticate appropriate access to the vehicle while in standby mode;
   e. the vehicle security device relay transitions to the ready mode when the user's smart device for the authorized vehicle operator is outside of a range indicating the user is no longer present; and
   f. the vehicle security device relay interrupts power to the ECU upon command signals from the relay thereby preventing vehicle doors and trunk from being unlocked.

7. The device for a vehicle according to claim 6 further comprising communications over a vehicle power bus.

8. The device for a vehicle according to claim 6 where the device is installed at the fuse port.

9. The device for a vehicle according to claim 6 wherein the device is operably connected to the OBD-II port.

10. The device for a vehicle according to claim 6 wherein the device and microcontroller can enter a low power sleep mode.

11. The device for a vehicle according to claim 6 further comprising microcontroller external inputs from wired sensors, wireless sensors, data received from other ECUs on a data bus, user input from a user interface, or peripheral devices.

12. The device for a vehicle according to claim 6 wherein the vehicle security transmitter/receiver can optionally encrypt the communication using an encryption key prior to encoding and transmitting.

13. The device for a vehicle according to claim 6 wherein the vehicle security device can communicate with multiple user smart devices from authorized vehicle operators.

14. The device for a vehicle according to claim 6 wherein the device returns to standby mode after a first interruption of power to the Vehicle ECU.

15. The device for a vehicle according to claim 14 wherein the device returns to standby mode and restores power to the Vehicle ECU.

* * * * *